Sept. 18, 1923.

S. H. LEWIS 1,468,481

FLUID PRESSURE CONTROL APPARATUS

Filed Nov. 19, 1920 6 Sheets-Sheet 1

Sept. 18, 1923.

S. H. LEWIS 1,468,481

FLUID PRESSURE CONTROL APPARATUS

Filed Nov. 19, 1920  6 Sheets-Sheet 3

Inventor
Samuel H. Lewis
Attorney

Sept. 18, 1923.

S. H. LEWIS 1,468,481

FLUID PRESSURE CONTROL APPARATUS

Filed Nov. 19, 1920 6 Sheets-Sheet 6

Inventor
Samuel H. Lewis

By

Attorney

Patented Sept. 18, 1923.

1,468,481

UNITED STATES PATENT OFFICE.

SAMUEL H. LEWIS, OF RICHMOND, VIRGINIA.

FLUID-PRESSURE-CONTROL APPARATUS.

Application filed November 19, 1920. Serial No. 425,087.

*To all whom it may concern:*

Be it known that I, SAMUEL H. LEWIS, a citizen of the United States, residing at Richmond, in the county of Henrico and State of Virginia, have invented certain new and useful Improvements in Fluid-Pressure-Control Apparatus, of which the following is a specification.

This invention relates to fluid pressure controlled apparatus for supplying steam to the cylinder or cylinders of railway locomotives when the main supply of steam is cut off and the engine is drifting by gravity or under its own momentum.

Railway locomotives are frequently operated by superheated steam which is heated to a temperature of about 600° F. This high temperature heats the walls of the cylinder of the engine so that oil used for lubrication will be burned or flashed upon introduction of air into the cylinders of the locomotive. When the main supply of steam is cut off, air will be drawn into the cylinders by the movement of the pistons, a partial vacuum being created therein. The present invention relates to means for introducing sufficient steam into the cylinders when the main valve is cut off and the engine is drifting, to prevent formation of a vacuum within the cylinder and the resulting admission of air.

In a prior application, Serial No. 245,936, I employ a pressure chamber having a pair of valves arranged therein, and a valve actuating member connected to a moving part of the engine for the purpose of alternately opening and closing said valves, whereby air under pressure is delivered to a chamber having a piston therein connected to the drifting steam valve. When suitable pressure has been built up in said chamber, the drifting steam valve is opened and will remain open as long as the speed of the engine is sufficient to operate the valves in the pressure chamber at such speed that compressed air or other gas will be delivered to the chamber associated with the drifting steam valve at a rate sufficient to maintain the proper pressure therein.

In the present invention, I have produced an apparatus embodying the features of my prior invention, wherein the chamber associated with the drifting steam valve communicates with the drifting steam pipe, or the main steam pipe, to establish a pressure on the opposite side of said piston equal to the pressure in the steam chest. By means of the present invention sufficient steam is fed to the cylinders to prevent the formation of a vacuum therein when the engine is drifting above a predetermined speed and at the same time, means are provided for automatically shutting off the drifting steam supply when a predetermined pressure is present in the steam chest indicating the presence of sufficient steam to prevent the formation of vacuums without the necessity of introducing additional steam through the drifting steam valve.

As in my prior application, when the speed of the engine decreases beyond a predetermined point, as when the engine is about to stop, the drifting steam valve will be closed by the decrease of pressure in the chamber associated with the drifting steam valve regardless of the pressure in the steam chest.

By varying the areas on the opposite side of the piston in the chamber associated with the drifting steam valve, the pressure necessary in the steam chest to overcome the pressure of the compressed air on the piston may be adjusted and thus the pressure at which the drifting steam valve will be closed, due to the presence of sufficient steam in the steam chest, may be varied.

In the accompanying drawings, I have shown one embodiment of the invention. In this showing.

Referring to the drawings, the reference numeral 1 designates a railway locomotive of any suitable type having a sand box 2 and a steam dome 73, as shown. The locomotive is provided with the usual cylinder 3 and steam chests 4 are arranged above the cylinders in the usual manner. A steam supply pipe 5 is connected to the steam chest. The usual distribution valve (not shown) is arranged within the steam chest and operated by a radius rod 6 in the usual manner.

Referring more particularly to Figures 2 to 9 of the drawings, the numeral 7 designates a control apparatus or pressure chamber which may be supported at any suitable point on the locomotive. As shown, it is formed with lugs 8 having openings 9 whereby it may be arranged on the valve chest head bracket 10 of the locomotive. A pair of chambers 11 and 12 are arranged within the pressure chamber, one of said chambers being provided with a pipe bushing 13, having an opening 14 arranged therein. The upper end of the other chamber is closed by a threaded plug 15. A pipe 16 is connected to the opening 14 and communicates with a tank 17, containing compressed air or other gas at suitable pressure above atmospheric pressure. If desired, a gas filter 18, packed with suitable filtering material 19 may be arranged in the pipe 16 (see Figure 2). The lower end of the chamber 11 is provided with a valve seat 20 and a valve 21 is arranged in the chamber. As shown, the valve is provided with a face 22 adapted to engage the valve seat when in closed position. A spring 24 is arranged between the top of the casing and the valve to normally hold it in closed position. The valve stem 25 extends through an opening 26 in the bottom of the chamber, which, as shown, is of greater diameter than the diameter of the stem to permit passage of air or other fluid. This opening communicates with the main pressure chamber 27, which is preferably made considerably larger than the chamber 11. The lower end of the chamber 12 is provided with an opening 28 and an outlet chamber 29 is arranged at the bottom of the pressure chamber having an opening in alinement with the opening 28. This opening is provided with a valve seat 30, adapted to be engaged by a valve 31 having a valve stem 32 which extends through the opening 28. A spring 33 is arranged on top of the stem to normally retain the valve in closed position. Beneath the valve member 31, the stem is reduced, as at 34, to permit passage of fluid to the outlet chamber through an opening 35 in the bottom of the chamber 27 when the valve is open. The outlet chamber is provided with an outlet opening 37 and with a drain opening in alinement with openings 28 and 35, which is normally closed by a threaded plug 38.

The valves 21 and 31 are adapted to be alternately opened and closed to permit passage of air under pressure from the inlet 14 to the outlet 37. Means are provided whereby the valves are alternately opened and closed at a speed proportionate to the speed of travel of the engine. The lower end of the pressure chamber is provided with a substantially circular extension 39 arranged at right angles to the body portion and adapted to receive a substantially cylindrical member 40. The substantially cylindrical member 40 is secured to the extension by means of screw-threads 41. As shown, this member is adapted to form a bearing for horizontal rock shaft 42, the inner end of which is provided with a substantially T-shaped operating member 43, one end 44 of which is adapted to engage the valve stem 25 when the shaft is rocked in a counterclockwise direction and open valve 21. The other end 45 of the T-shaped member operates in a recess 46 in the valve stem 32 (see Figure 9) and is adapted to engage a shoulder 47 formed by the recess when the valve is operated in a clockwise direction to raise the stem and open valve 31.

Figures 3, 4:
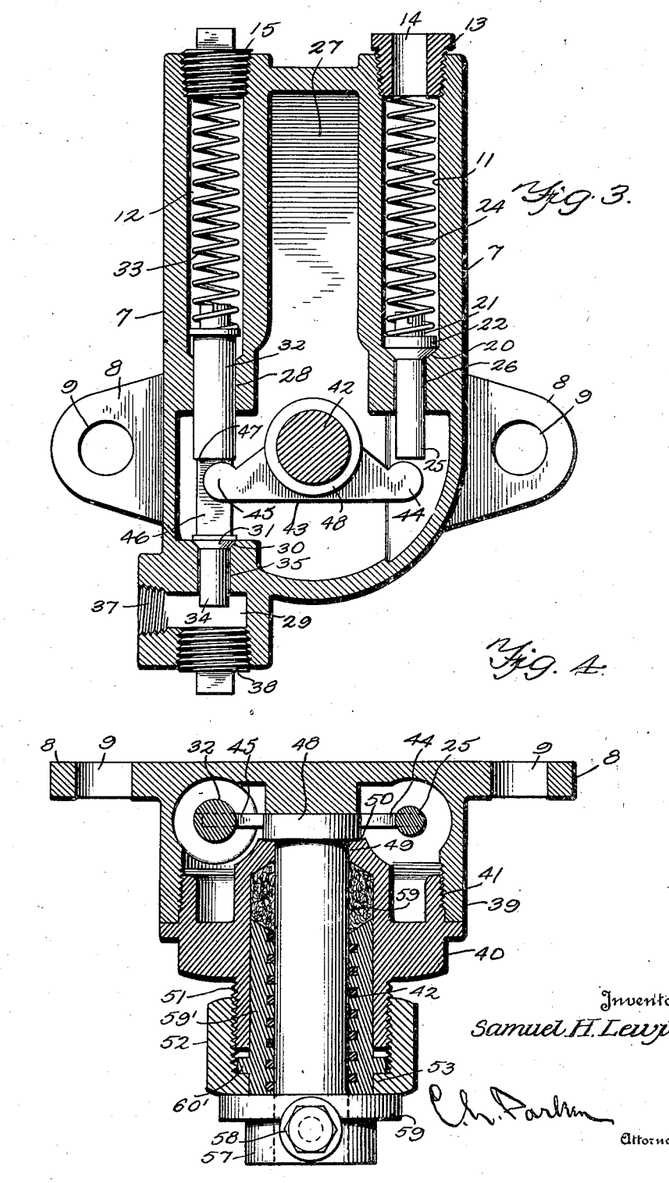
Figure 3 is a vertical transverse sectional view thereof.
Figure 4 is a transverse horizontal sectional view on line 4—4 of Figure 2.
Figures 5, 7:
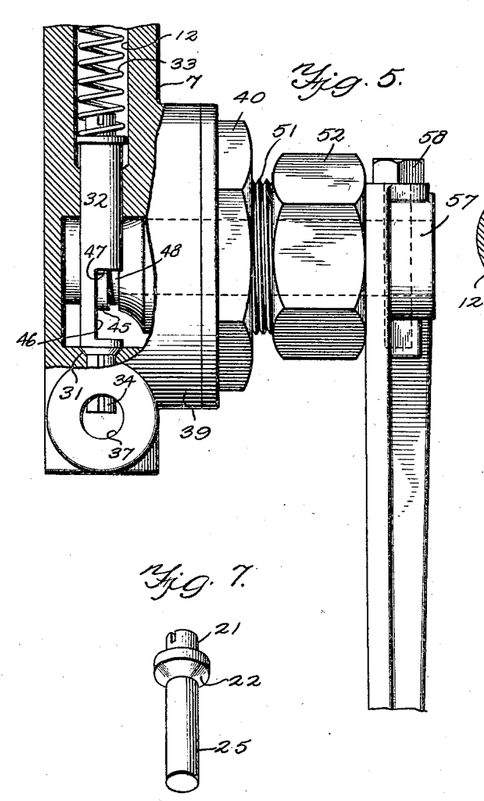
Figure 5 is a side elevation of the mechanism for actuating the valves in the pressure chamber, parts of the pressure chamber being shown in section.
Figure 7 is a detail perspective view of one of the valves employed in the pressure chamber.
Figure 6:
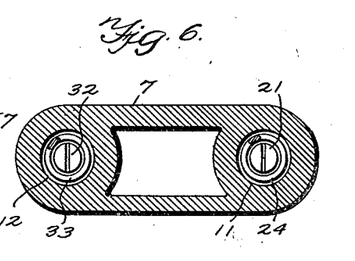
Figure 6 is a sectional view on line 6—6 of Figure 2.
Figure 8:
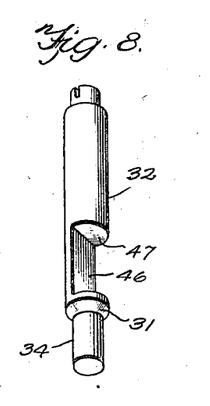
Figure 8 is a similar view of the other valve.
Figure 9:
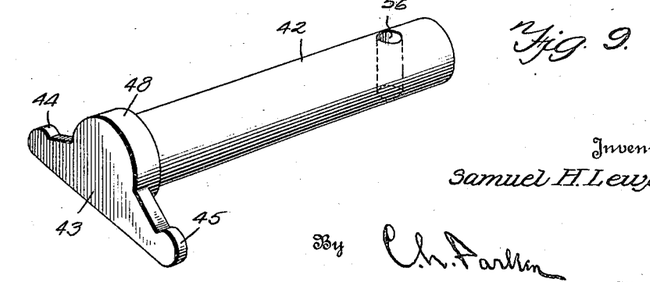
Figure 9 is a detail perspective view of a portion of the valve actuating mechanism.

Referring to Figure 4 of the drawings, the end of the rock shaft is enlarged, as at 48, and the cylindrical member 40 is provided with a reduced opening 49, whereby the inner end 50 of the cylindrical member 40 will engage the end 48 and retain the rock shaft in position. The opposite end of the cylindrical member 40 is threaded, as at 51, for the reception of a hollow nut 52, having a reduced opening in its outer end, providing a shoulder 53. A lever 54 is secured on the outer end of the rock shaft, and this lever is connected to a link 55, operating in conjunction with the valve stem of the engine, whereby the speed of oscillation of the rock shaft will be controlled by the speed of the locomotive. The upper end of the lever is arranged on the end of the rock shaft, as shown, the rock shaft being provided with an opening 56 for the reception of a bolt or pin 57, which passes through the lever and rock shaft. Suitable packing 59 may be arranged around rock shaft 42, the packing being held in position by a packing gland 59'. The packing gland is provided with a rib 60', adapted to be engaged by the nut 52 to permit tightening of the packing 59.

Figure 1:
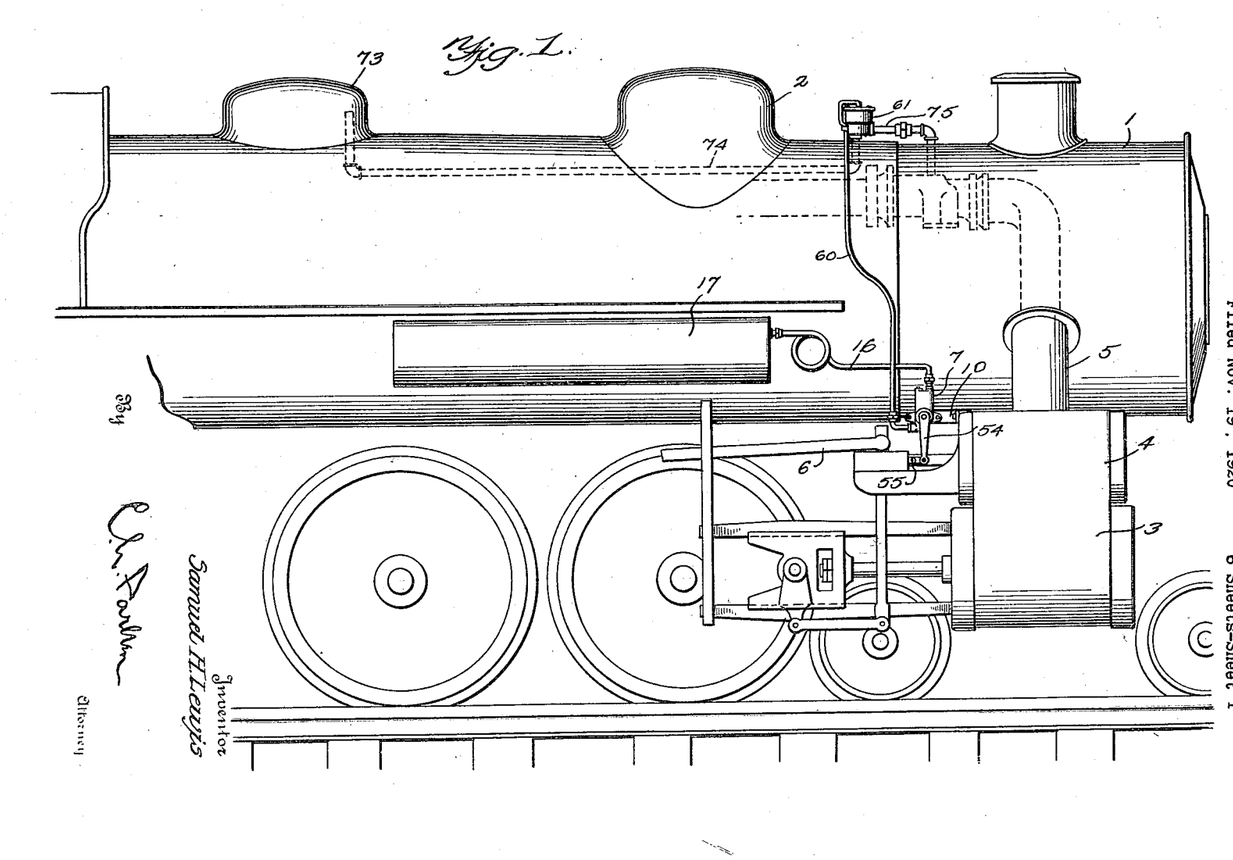
Figure 1 is a side elevation of a railway locomotive showing the invention applied thereto.
Figure 2:
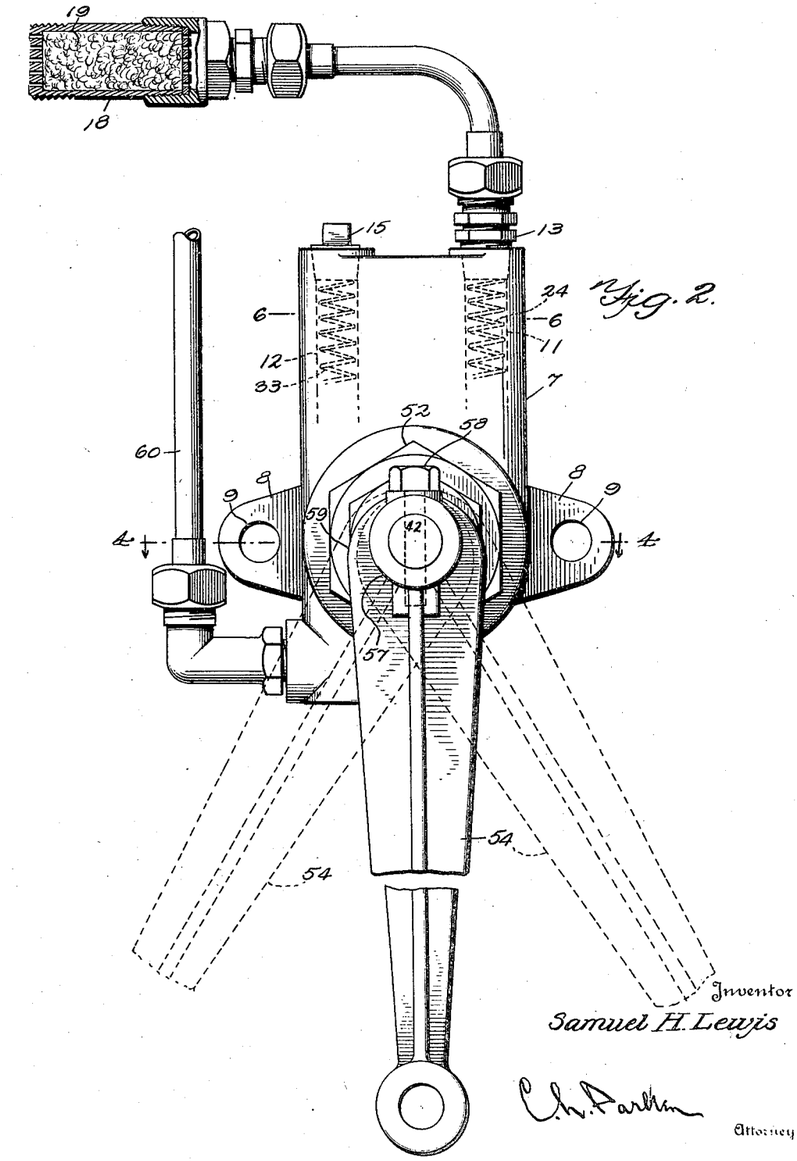
Figure 2 is a side elevation of the pressure chamber and associated parts.
Figure 10:
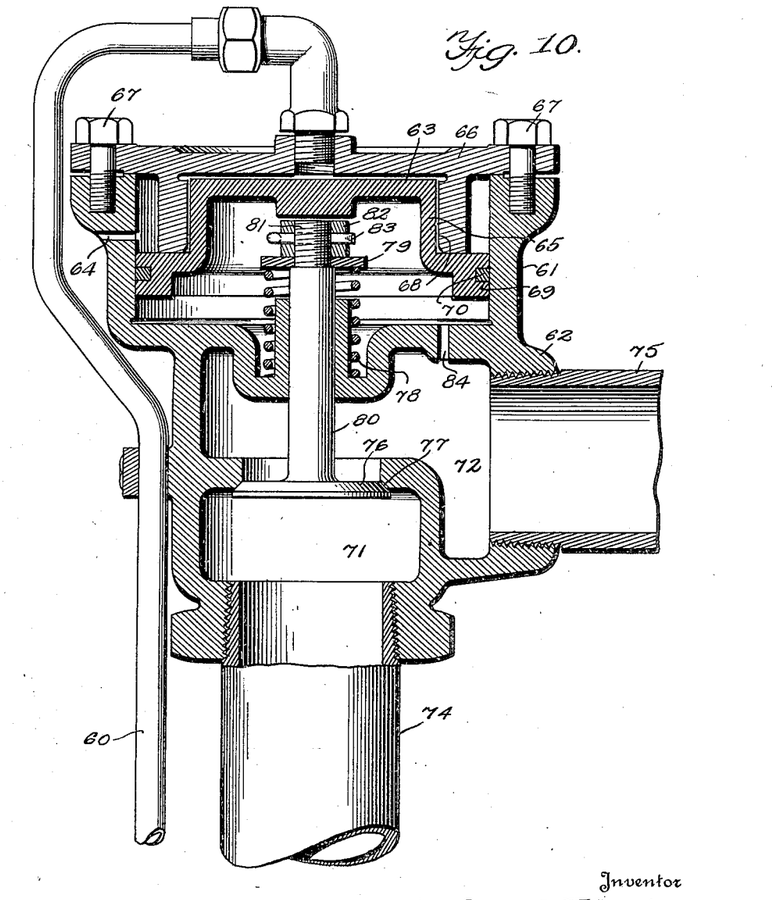
Figure 10 is a sectional view of one form of drifting steam valve and associated elements.

Referring to Figure 1, 2, and 10 of the drawings, a pipe 60 is connected to the outlet opening 37 of the pressure chamber, and this pipe communicates with a cylinder 61, arranged adjacent the valve casing 62. A piston 63 is arranged in the cylinder, the piston loosely fitting the cylinder to permit leakage of air into the lower portion of the cylinder, whereby the air is exhausted to the atmosphere through opening 64. As shown, the upper portion of the cylinder is of smaller diameter than the lower portion, an auxiliary cylindrical member 65 being arranged in the upper portion, the member being carried by the cylinder head 66 which is secured to the cylinder proper by means of bolts 67. The piston likewise comprises an upper portion 68 and a lower portion 69. The lower portion of the piston is provided with rings 70 to prevent leakage of steam from the lower side of the piston to the atmosphere through opening 64.

The valve casing 62 is provided with an inlet 71 and an outlet 72. The inlet is in communication with a steam dome 73 through the medium of pipe 74, and the outlet is in communication with the main steam pipe through the medium of pipe 75. A drifting steam valve 76 is arranged in the valve casing and is normally maintained on valve seat 77 by a coil spring 78 arranged in the lower portion of the cylinder 61 and engaging a plate or washer 79, carried by the upper end of the valve stem 80. As shown, the valve stem extends through an opening in the bottom of the cylinder 61 and is provided with a threaded end 81 for the reception of a nut 82, whereby the washer 79 is retained on the stem. The nut may be provided with suitable locking means such as pin 83, adapted to extend through alining openings in the nut and the end of the valve stem. The valve casing is provided with a port 84 to permit introduction of steam into the lower portion of the cylinder 61.

Figure 11:
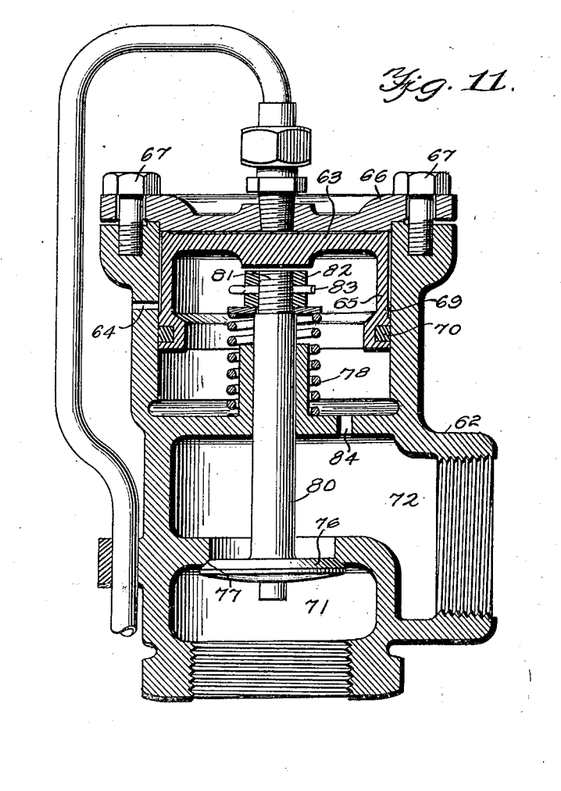
Figure 11 is a similar view showing a slightly different arrangement of parts, and, Figure 12 is a sectional view showing another type of drifting steam valve.

Referring to Figure 11 of the drawings, I have there disclosed a slightly modified construction of the drifting valve casing and cylinder wherein the area of the cylinder and pistion is the same throughout. Similar parts are designated by the same reference numerals in this view. As shown, the piston ring 70 is at all times below the outlet opening 64, whereby air in the upper portion of the cylinder may exhaust to the atmosphere, the diameter of the piston being slightly smaller than the diameter of the cylinder, whereby flow of air to the exhaust opening 64 at a retarded speed, is permitted.

Figure 12:
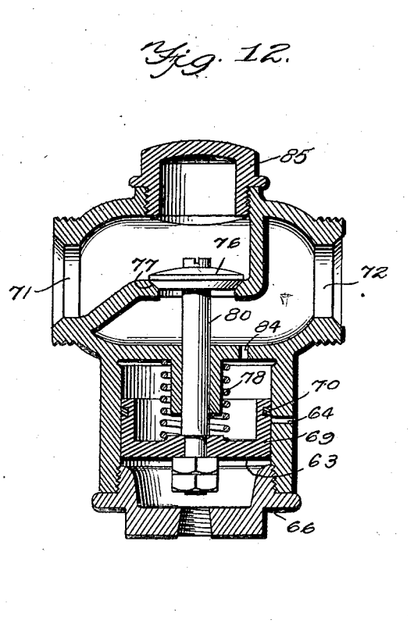

In the construction shown in Figure 12 of the drawings, the drifting valve inlet and outlet openings are arranged in alinement with each other instead of at right angles. The construction of the piston and cylinder is substantially the same as in Fgure 11 of the drawings, but the parts are shown arranged reversely with the valve 76 opening upwardly instead of downwardly. As shown, the top of the valve casing is provided with an opening normally closed by threaded plug 85 to permit access to the valve.

The operation of this device is as follows: As in the construction disclosed in my copending application, the invention is designed to supply steam to the cylinders when the locomotive is moving with the main throttle valve closed to prevent formation of vacuum in the cylinders. The control apparatus is operated at a speed directly proportionate to the speed of the locomotive, whereby the supply of drifting steam will be cut off when the speed of the engine drops below a predetermined speed, as when the locomotive is about to stop and presence of steam in the cylinder is undesirable. When the engine is running, the rock shaft 42 is oscillated at a speed directly proportionate to the speed of the locomotive through lever 54. The valves 21 and 31 are alternately opened and closed, whereby air under pressure passes from the tank 17 through pipe 16, chamber 11 to the body of the pressure chamber and thence to the outlet chamber 29. From the outlet chamber 29, it is conveyed to the cylinder 61, through pipe 60, and when the speed of the engine is sufficient to supply compressed air to the chamber 60 at a rate greater than the rate of exhaust through the opening 64, a pressure is built up in the cylinder 60, which when the main throttle valve is closed, moves the piston 63 downwardly into engagement with the valve stem 80, and forces the valve stem downwardly against the tension of spring 78 and steam pressure below valve 76, to open valve 76. When valve 76 is opened, steam is supplied to the steam chests of the engine through pipes 74 and 75, and main steam pipe 5. As soon as the speed of the engine drops to a point where the valves 21 and 31 are not operated with sufficient rapidity to supply air to the cylinder 61, at a greater rate than the rate of exhaust through opening 64, the piston 63 will be moved upwardly by spring 78 and steam admitted through port 84 out of engagement with valve stem 80 and the valve 76 will be closed by the spring 78.

In addition to the means whereby the drifting valve is automatically closed when the engine is drifting below a predetermined speed, means are provided for automatically closing the drifting steam valve when the pressure in the steam chest is sufficient to indicate the presence of enough steam to properly supply the cylinders without the admission of additional steam through the drifting steam valve. By means of the opening 84 in the valve casing 62, the lower end of cylinder 61 communicates with the pipe 75. The pressure in pipe 75 at all times approximates the pressure in the steam chest. This pressure is communicated to the lower side of the piston and counteracts the pressure of the compressed air supplied by the control apparatus. In the form of the invention shown in Figure 10 of the drawings the leakage past the smaller end of the piston is substantially equal to the leakage through port 64 whereby no pressure will be built up above the larger end of the piston between the auxiliary cylindrical member 65 and the cylinder wall. Therefore, the lower effective area of the piston is substantially twice as great as the upper effective area, whereby the piston will be moved upwardly by a lower pressure exhausting in the steam chest. When the pressure in the lower end of the cylinder is sufficient to move the piston upwardly out of contact with the valve stem, the valve is closed by spring 78 and the supply of drifting steam is cut off.

In the form of the invention shown in Figures 11 and 12 of the drawings, the operation is the same, except that the piston is of substantially the same diameter throughout and its upper and lower areas are substantially equal. In either of these two forms of the invention, a greater pressure is necessary in one end of the cylinder to offset the air pressure in the opposite end and move the piston to the end of the cylinder to permit the valve to close. By regulating the effective areas of the upper and lower faces of the piston, the pressure in one end of the cylinder necessary to offset the pressure in the opposite end may be adjusted within wide limits.

While I have shown and described the preferred embodiments of my invention, it is to be understood that various changes in the shape, size, and arrangement of parts, may be resorted to without departing from the spirit of the invention or the scope of the subjoined claims.

Having thus described my invention, I claim:

1. In apparatus for supplying steam to the cylinders of steam locomotives while in motion, a fluid pressure control member connected to a movable part of a locomotive to move in unison therewith and deliver fluid pressure therethrough in proportion to the speed of the locomotive, a cylinder communicating with said control member, said cylinder being arranged adjacent the steam supply pipe, a valve mounted in said supply pipe, a piston mounted in said cylinder and connected to said valve, said cylinder being provided with means to permit the gradual exhaust of a portion of the fluid delivered thereto, whereby the piston therein will be actuated to open the valve when the speed of the locomotive exceeds a predetermined point, and means for supplying steam to said cylinder on the opposite side of the piston to counter act said fluid under pressure.

2. In apparatus for supplying steam to the cylinders of steam locomotives while in motion, a fluid pressure control member connected to a movable part of the locomotive to operate in unison therewith, a cylinder communicating with said control member, a steam supply pipe arranged adjacent said cylinder, a piston mounted in said cylinder, a valve mounted in said pipe and connected to said piston, said cylinder being provided with a leak port to permit gradual exhaust of fluid therefrom, whereby the control member will supply sufficient fluid to the cylinder to maintain a pressure therein when the locomotive assumes a predetermined speed, and means for supplying steam to the opposite end of the cylinder to counter-act said fluid under pressure.

3. In apparatus for supplying steam to the cylinders of steam locomotives while in motion, a fluid pressure motor having a slow leak therein whereby said motor is only actuated when a predetermined amount of fluid under pressure is admitted thereto, means to supply steam to the cylinders operated by said fluid pressure motor, means for supplying fluid under pressure to said motor, and means for supplying steam to said motor to counter-act the effect of said fluid under pressure.

4. In apparatus for supplying steam to the cylinders of a railway locomotive while moving, a fluid pressure motor having a slow leak therein, means to supply steam to the cylinders operated by said fluid pressure motor, a pressure chamber to supply fluid under pressure to the motor, means to control the inlet and outlet of fluid pressure to and from the chamber, said control means being connected with a movable part of the locomotive to operate in unison therewith, and means for supplying steam to said motor to counter-act the effect of said fluid, said motor being adapted to operate when the speed of the locomotive exceeds a predetermined point.

5. The combination with the steam engine of a locomotive, said engine comprising a steam chest, of means for supplying steam to said steam chest when the locomotive is in motion and the throttle is closed, said means comprising a fluid pressure motor having a slow leak therein, means to supply steam to the steam chest operated by said fluid pressure motor, a pressure chamber to supply fluid under pressure to the motor, means to control the inlet and outlet of fluid to and from the pressure chamber, said control means being connected to a movable part of the locomotive to move in unison therewith, and means for supplying steam to the motor from the steam chest to counteract the effect of said fluid whereby the motor is normally set in action when the speed of the locomotive exceeds a predetermined point, but is rendered inoperative when the pressure in the steam chest exceeds a predetermined point.

6. The combination with the steam engine of a locomotive, said engine having a steam chest, of means for supplying steam to the steam chest when the locomotive is in motion and the throttle is closed, said means comprising a fluid pressure motor, said motor having means to permit the gradual exhaust of a portion of the fluid supplied thereto and being adapted to be set in action when the pressure therein reaches a predetermined point, a pressure chamber to supply fluid to the motor, means to control the inlet and outlet of fluid to and from the chamber, said control means being connected to a movable part of the locomotive to operate in unison therewith, and means for supplying steam from the steam chest to said motor to counter-act the effect of said fluid whereby the motor is normally set in action when the speed of the locomotive exceeds a predetermined point, but is rendered inoperative when the pressure in the steam chest exceeds a predetermined point.

7. The combination with the steam chest of a locomotive engine, of means for supplying steam to said steam chest when the locomotive is in motion and the throttle is closed, said means comprising a fluid pressure motor, said fluid pressure motor being provided with means to permit gradual exhaust of fluid therefrom, said motor being set in operation when the flow of fluid therethrough reaches a predetermined point, means to intermittently supply fluid to the motor, said supply means being connected with a movable part of the locomotive, and means for supplying steam from the steam chest to said motor to counter-act the effect of said fluid whereby the motor is normally set in action when the speed of the locomotive exceeds a predetermined point, but is rendered inoperative when the pressure in the steam chest exceeds a predetermined point.

8. The combination with the steam engine of a locomotive, said engine including a steam chest, of means for supplying steam to said steam chest when the locomotive is in motion and the throttle is closed, said means comprising a fluid pressure motor, said motor having means to permit the gradual exhaust of a portion of the fluid supplied thereto, means operated by said motor to supply steam to the steam chest, said motor being set in operation when the pressure therein reaches a predetermined point, a pressure chamber to supply fluid to the motor, operating means for said pressure chamber connected to a movable part of the locomotive to be operated thereby to control the inlet and outlet of fluid to and from the chamber, said motor being provided with an opening communicating with the steam supply whereby steam from the steam chest will be delivered to said motor to counter-act the effect of the fluid therein and render said motor inoperative when the pressure in the steam chest exceeds a predetermined limit.

9. The combination with the steam engine of a locomotive, said engine having a steam chest, of means for supplying steam to said steam chest when the locomotive is in motion and the throttle is closed, said means comprising a fluid pressure motor, said motor having means to permit the gradual exhaust of a portion of the fluid supplied thereto, means to supply steam to the steam chest operated thereby, said fluid pressure motor being set in action when the fluid pressure therein reaches a predetermined point, a pressure chamber to supply fluid to the motor, means connected with a movable part of the locomotive to control the inlet and outlet of fluid to and from the chamber, said motor being provided with an opening arranged opposite the fluid pressure inlet and communicating with the steam supply means whereby steam from the steam chest will be delivered to the motor to counter-act the effect of the fluid therein and render the motor inoperative when the steam pressure in the steam chest exceeds a predetermined limit.

In testimony whereof I affix my signature in presence of two witnesses.

SAMUEL HANCE LEWIS.

Witnesses:
  ROBT. H. TALLER,
  THOMAS B. SINOD.